United States Patent [19]
Dietz et al.

[11] Patent Number: 6,024,183
[45] Date of Patent: Feb. 15, 2000

[54] TRACK BELT TENSION MANAGEMENT SYSTEM

[75] Inventors: Hans P. Dietz, Naperville; William C. Evans; Brad L. Holsapple, both of Metamora; Michael L. Knussman, East Peoria; David R. Meinhold, Metamora; Stephen T. Tady, Washington, all of Ill.

[73] Assignee: Caterpillar Inc., Peoria, Ill.

[21] Appl. No.: 08/958,350

[22] Filed: Oct. 24, 1997

[51] Int. Cl.[7] ................................................. B62D 55/30
[52] U.S. Cl. .......................... 180/9.1; 305/144; 305/149; 305/153
[58] Field of Search .................................. 305/143, 144, 305/145, 149, 153; 180/9.1, 9.62, 9.64

[56] References Cited

U.S. PATENT DOCUMENTS

| | | |
|---|---|---|
| 2,452,671 | 11/1948 | Merrill . |
| 2,998,098 | 9/1961 | Hyler et al. . |
| 3,972,569 | 8/1976 | Bricknell .................................. 305/144 |
| 4,537,267 | 8/1985 | Satzler ..................................... 180/9.1 |
| 4,681,376 | 7/1987 | Riml ........................................ 305/149 |
| 4,840,437 | 6/1989 | Henry et al. ............................. 305/144 |
| 4,986,377 | 1/1991 | Moriarty .................................. 180/6.5 |
| 5,165,765 | 11/1992 | Baylor ..................................... 305/144 |
| 5,334,106 | 8/1994 | Purcell ..................................... 474/110 |
| 5,372,212 | 12/1994 | Davis ....................................... 180/9.1 |

FOREIGN PATENT DOCUMENTS

| | | |
|---|---|---|
| 2129178 | 1/1995 | Canada . |
| 0332869 | 2/1989 | European Pat. Off. ......... B62D 55/30 |
| 0657343 | 10/1994 | European Pat. Off. ......... B62D 55/30 |
| WO9609951 | 4/1996 | Russian Federation ....... B62D 55/30 |
| 91/10586 | 7/1991 | WIPO ............................ B62D 55/30 |
| 92/17364 | 10/1992 | WIPO ............................ B62D 55/30 |

*Primary Examiner*—Kevin Hurley
*Assistant Examiner*—Avraham H. Lerner
*Attorney, Agent, or Firm*—Kate M. Ryan

[57] ABSTRACT

A track belt tensioning management system is provided for actively adjusting the tension on a track belt in response to the difference in linear output speed between a drive wheel and the track belt. This is accomplished by sensing the speeds of the drive wheel and the track belt and delivering the sensed signals to a controller which processes the signals and determines the difference in their respective linear output speeds. If the difference varies from a predetermined value, the controller directs appropriate signals to a hydraulic valve arrangement which controllably directs pressurized fluid to and from a hydraulic actuator arrangement to adjust the tension between the drive wheel and the track belt. The subject arrangement maintains sufficient frictional force between the drive wheel and the belt to control the slip therebetween as required while at the same time limiting the forces in order to reduce premature failures and/or wear on the track belt and other associated components.

13 Claims, 5 Drawing Sheets

TRACK BELT TENSION MANAGEMENT SYSTEM

TECHNICAL FIELD

This invention relates generally to tensioning the track belts of a machine utilizing a friction drive between the respective drive wheels and track belts and more particularly to actively changing the tension in the respective track belts in response to relative slip between the drive wheel and the track belt.

BACKGROUND ART

It is well known to provide a machine having a frictional drive between a track belt and a drive wheel. In some applications, there is only one drive wheel and one track belt. In many applications, a drive wheel and a track belt are located on both sides of the machine. In these applications, the respective track belt is wrapped around the drive wheel and an idler wheel. In order to control the tension on the track belt to ensure proper frictional drive forces between the drive wheel and the track belt, a force is applied to the idler wheel to force it further from the drive wheel. As known, this force is applied by using a spring to push or pull the idler wheel. This force is also applied by connecting a hydraulic cylinder to the idler wheel and applying pressurized fluid to the cylinder in order to push or pull the idler wheel. It is necessary to provide sufficient force on the track belt to ensure that the track belt does not slip relative to the wheel during varying operating conditions, such as dry conditions verses muddy conditions. The force between the drive wheel and the track belt needs to be higher when operating is mud or other slippery types of conditions. In order to reduce the fatigue on other associated components, the force between the drive wheel and the track belt should be lower when operating in dry conditions.

In most applications, a high force is applied to the idler wheel so that the machine can operate in any condition. However, this constant high force subjects the track belt and other associated components to extra wear and could result in premature failure. It has been known to apply an adjustable force to the track belt tensioning mechanism. However, the operator may not be aware that the track belt is slipping relative to the drive wheel, thus creating an inefficient operating system. Additionally, the operator may be applying a force that is much higher than needed, thus subjecting the track belt and the associated components to undue wear and/or premature failure.

The present invention is directed to overcoming one or more of the problems as set forth above.

DISCLOSURE OF THE INVENTION

In one aspect of the present invention a tension management system is provided and adapted for use on a machine having a friction drive between a drive wheel of the machine and a track belt. The machine includes a source of pressurized fluid, a reservoir, a frame, and a hydraulic actuator arrangement acting through an idler wheel to tension the track belt with respect to the drive wheel. The tension management system includes a first sensor operative to sense the speed of the drive wheel, a second sensor operative to sense the speed of the track belt, and a third sensor operative to sense the operating pressure in the hydraulic actuator arrangement. A hydraulic valve arrangement is provided and connected between the source of pressurized fluid, the hydraulic actuator arrangement, and the reservoir. The tension management system also includes a controller operative to receive the sensed speeds of the drive wheel and the track belt and determine their respective linear output speeds and deliver control signals to the hydraulic valve arrangement to control the tension of the track belt on the drive wheel in response to the difference in linear output speed between the drive wheel and the track belt changing from a predetermined value.

BEST MODE FOR CARRYING OUT THE INVENTION

Figure 1:
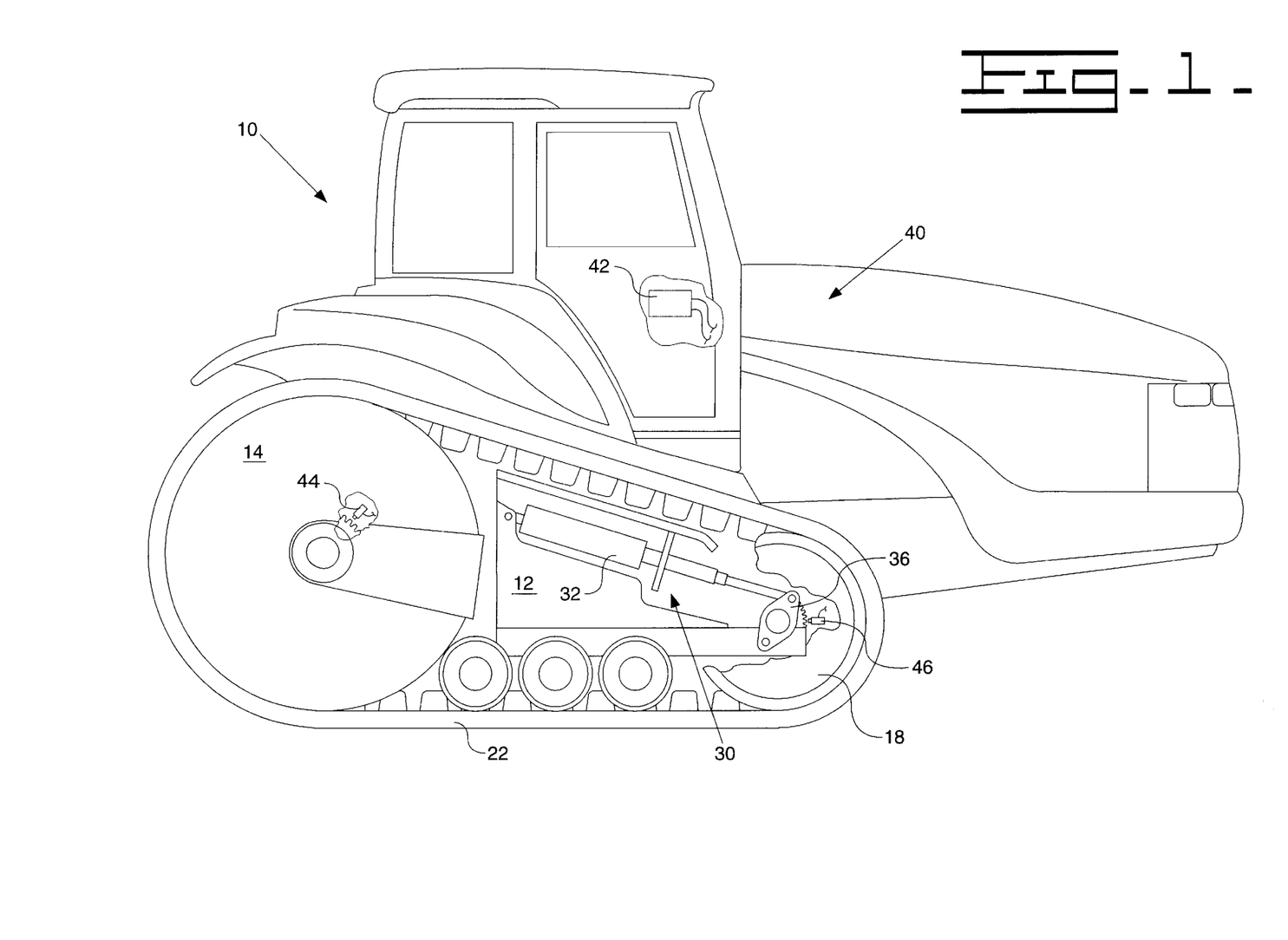
FIG. 1 is a representation of a machine incorporating an embodiment of the subject invention.
Figure 2:
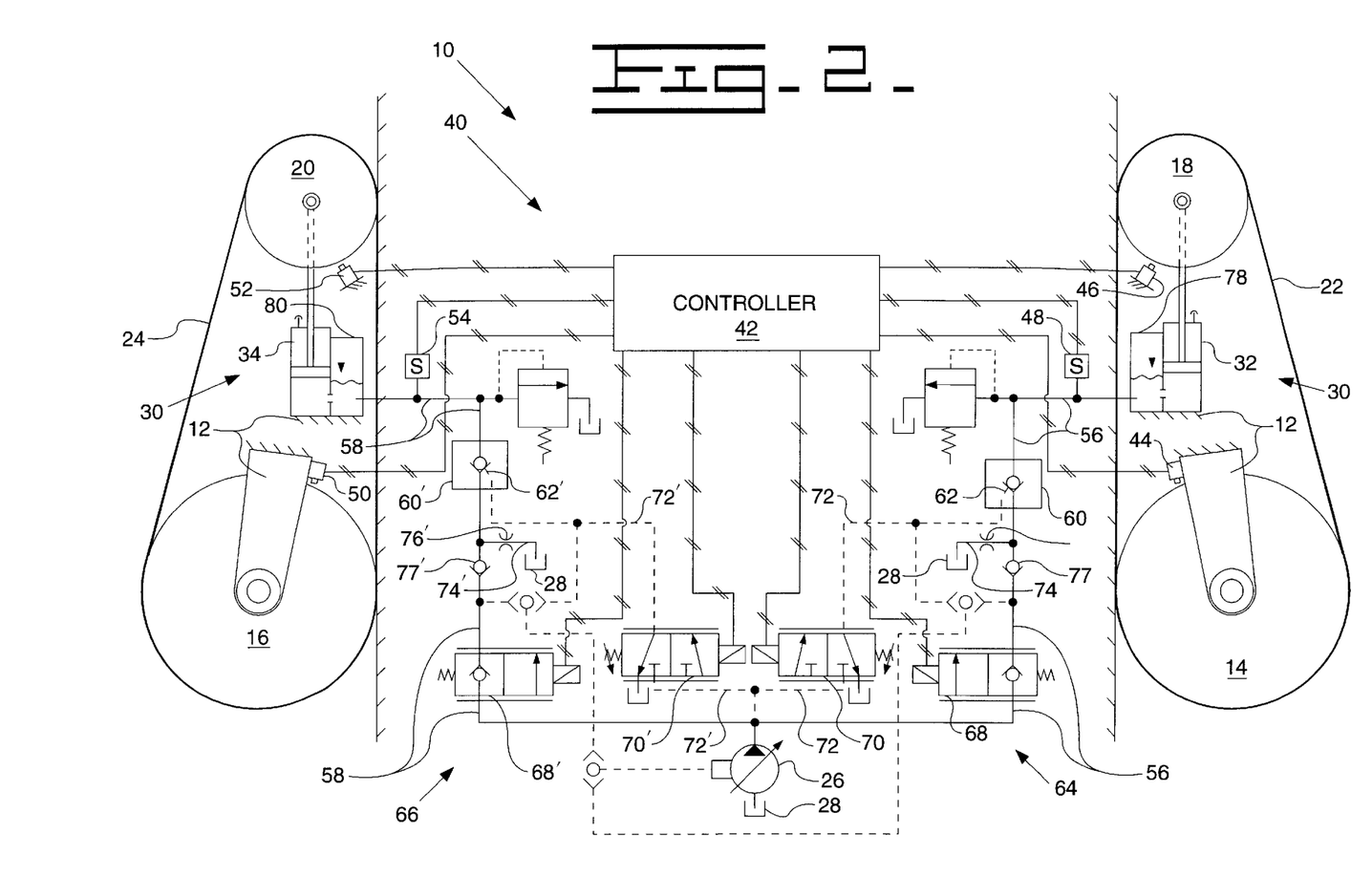
FIG. 2 is a partial diagrammatic and partial schematic representation of one embodiment of the subject invention.

Referring to the drawings, and more particularly to FIGS. 1 and 2, a machine 10 is illustrated and includes a frame assembly 12, first and second drive wheels 14,16 and first and second idler wheels 18,20 each disposed on opposite sides of the machine 10 with first and second track belts 22,24 disposed about the respective drive and idler wheels 14,18/16,20. It is recognized that the frame assembly 12 could be one unitary frame or it could have a main machine frame with separate undercarriage frames attached thereto without departing from the essence of the subject invention. The machine 10 also includes a source of pressurized fluid, such as a variable displacement pump 26, a reservoir 28, and a hydraulic actuator arrangement 30. It is recognized that a fixed displacement pump could also be used. The hydraulic actuator arrangement 30 includes first and second hydraulic cylinder arrangements 32,34 located on opposite sides of the machine 10.

Each of the hydraulic cylinder arrangements 32,34 are connected between the frame assembly 12 and the respective idler wheels 18,20. Even though in the subject embodiment, the hydraulic cylinder arrangements 32,34 are disposed to exert a pushing force on the respective idler wheels 18,20, it is recognized that the hydraulic cylinder arrangements 32,34 could be disposed to exert a pulling force on the respective idler wheels 18,20. Likewise, it is recognized that the idler wheels 18,20 could be independent of each other or connected to each other by an axle assembly without departing from the essence of the subject invention.

As illustrated in FIG. 1 with reference to only one side of the machine 10, the cylinder arrangement 32 is exerting a pushing force on the idler wheel 18 by exerting a pushing force on one end of a link 36. The link 36 is connected at the other end to the frame 12 with the idler wheel 18 connected to the link 36 between the connections points of the cylinder arrangement 32 and the frame assembly 12. It is recognized that other arrangements for connecting the cylinder arrangement 32 to the idler wheel 18 could be utilized without departing from the essence of the subject invention.

A tension management system 40 is disposed on the machine 10 and operative to actively control the frictional force between the respective track belts 22,24 and the respective drive wheels 16,18. It is well known that the tension in each of the track belts 22,24 is directly proportional to the magnitude of the frictional force between the respective drive wheels 14,16 and its associated track belt 22,24.

The tension management system 40 includes a controller 42 disposed on the machine 10 and a plurality of sensors operative to sense various operating parameters of the machine 10. The plurality of sensors includes a first sensor 44 operative to sense the speed of the first drive wheel 14, a second sensor 46 operative to sense the speed of the first idler wheel 18, and a third sensor 48 located generally adjacent the first hydraulic cylinder arrangement 32 and operative to sense the operating pressure in the first hydraulic cylinder arrangement 32. Each of the sensed signals from the first, second, and third sensors 44,46,48 is directed to the controller 42. It is recognized that the speed of the respective drive wheels 14,16 could be sensed at the drive wheel as shown or sensed at or within a transmission, a steering system or final drive (not shown) without departing from the essence of the subject invention.

The plurality of sensors also includes a fourth sensor 50 operative to sense the speed of the second drive wheel 16, a fifth sensor 52 operative to sense the speed of the second idler wheel 20, and a sixth sensor 54 located generally adjacent the second hydraulic cylinder arrangement 34 and operative to sense the operating pressure in the second hydraulic cylinder arrangement 34. Each of the sensed signals from the fourth, fifth, and sixth sensors 50,52,54 is also directed to the controller 42.

The source of pressurized fluid 26 is connected to the respective first and second hydraulic cylinder arrangements 32,34 through respective first and second supply conduits 56,58.

A first pilot operated check valve 60 having a pilot stage 62 is provided and disposed in the first supply conduit 56 between the pump 26 and the first hydraulic cylinder arrangement 32. The pilot operated check valve 60 permits fluid flow towards the hydraulic cylinder arrangement 32 and operates to check or block the flow in the opposite direction.

The tension management system 40 also includes first and second hydraulic valve arrangements 64,66. Since each of the first and second hydraulic valve arrangements 64,66 are the same, only the first one of them will be described in detail. The elements of the second one are labeled with the same element number with a prime symbol attached thereto.

The first hydraulic valve arrangement 64 includes a first control valve, such as an electrically actuated control valve 68, disposed in the first supply conduit 56 between the pump 26 and the pilot operated check valve 60. As illustrated in FIG. 2, the first control valve 68 is an infinitely variable control valve. It is recognized that the first control valve 68 does not have to be infinitely variable. The first control valve 68 is movable between a first, spring biased position, at which fluid flow from the pump 26 towards the hydraulic cylinder arrangement 32 is blocked and a second position at which the fluid flow from the pump 26 freely passes therethrough. The first control valve 68 is movable towards the second position in response to receipt of an electrical signal from the controller 42.

The first hydraulic valve arrangement 64 also includes a second control valve, such as an electrically actuated control valve 70, disposed in a pilot conduit 72 between the pump 26 and the pilot stage 62 of the pilot operated check valve 60. The second control valve 70 is spring biased to a first position, at which the portion of the pilot conduit 72 between the second control valve 70 and the pilot stage 62 is in communication with the reservoir 28. The second control valve 70 is movable towards a second position in response to receipt of an electrical signal from the controller 42. At the second position of the second control valve 70, the pump is in communication with the pilot stage 62 of the pilot operated check valve 60.

A drain conduit 74 is provided and connected to the first supply conduit 56 between the first control valve 68 and the pilot operated check valve 60. A restrictor, such as an orifice 76, is disposed in the drain conduit 74. A second drain conduit 74' having an orifice 76' disposed therein is connected to the second supply conduit 58 between the control valve 68' and the pilot operated check valve 60'. The hydraulic valve arrangements 64,66 also includes respective one-way check valves 77,77' disposed in the respective first and second supply conduits 56,58 at a location between the control valves 68,68' and the point of connection of the respective drain conduits 74,74'. The one-way check valve 77/77' permits flow towards the respective hydraulic cylinder arrangements 32,34 and blocks flow in the reverse direction and is operative to inhibit the pressurized fluid returning from the hydraulic cylinder arrangements 32,34 to the reservoir 28 from the actuator being subjected to the pump controls.

First and second accumulators 78,80 are respectively connected to the respective first and second supply conduits 56,58 adjacent the first and second hydraulic cylinder arrangements 32,34. As illustrated in FIG. 2, the accumulators 78,80 are mounted directly to the appropriate hydraulic cylinder arrangement 32/34 and the respective supply conduits 56,58 are connected to the appropriate one of the hydraulic cylinder arrangements 32,34 through the associated accumulator 78/80.

Figure 3:
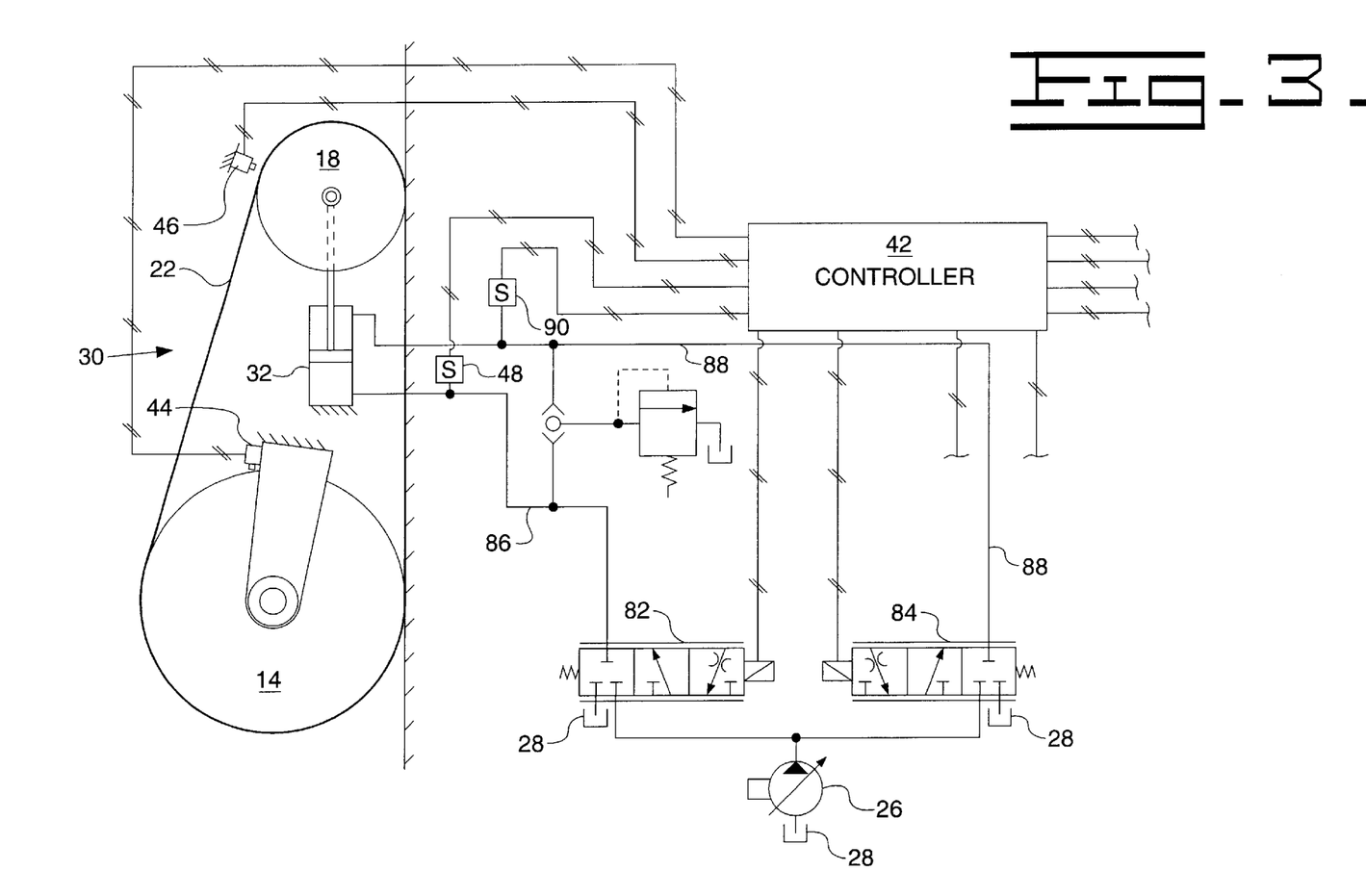
FIG. 3 is a partial diagrammatic and partial schematic representation of another embodiment of the subject invention.

Referring to FIG. 3, another embodiment of the subject invention is illustrated. In the embodiment of FIG. 3 like elements have like element numbers. For simplicity only one side of the machine 10 is being illustrated and described. It is to be understood that the controller 42 also receives signals from the second side and directs control signals to the second side for controlling the tension of the track belt 24 on the second side. In FIG. 3, the hydraulic cylinder arrangement 32 of the hydraulic actuator arrangement 30 is a double acting cylinder and the hydraulic valve arrangement 64 includes first and second three position control valves 82,84 disposed between the pump 26 and the respective ends of the double acting cylinder arrangement 32. Each of the first and second three position control valves 82,84 are operative to control the fluid flow to and from the associated ends of the double acting cylinder arrangement 32.

Each of the control valves 82,84 are spring biased to a first position at which fluid flow is blocked in all directions. Each of the control valves 82,84 is movable towards one and the other of its operative positions in response to receipt of an electrical signal from the controller 42. At the one operative position of the first three position control valve 82, the pump 26 is in communication with the one end of the hydraulic cylinder 32 through a conduit 86 and the reservoir 28 is blocked therefrom. At its second operative position, the pump flow is blocked and the one end of the hydraulic cylinder 32 is in communication with the reservoir 28. At the one operative position of the second three position control valve 82, the pump 26 is in communication with other end of the hydraulic cylinder 32 through a conduit 88 and the reservoir 28 is blocked therefrom. At its second operative position, the pump flow is blocked and the other end of the hydraulic cylinder 32 is in communication with the reservoir 28. It is recognized that an accumulator would normally be needed to provide for recoil of the respective idler wheels 18,20.

The third sensor 48 is connected to the conduit 86 adjacent the hydraulic cylinder arrangement 32 and a seventh sensor 90 is connected to the conduit 88 adjacent the hydraulic cylinder arrangement 32. The seventh sensor 90 directs a signal to the controller 42 that is representative of the pressure in the other end of the hydraulic cylinder arrangement 32.

Figure 4:
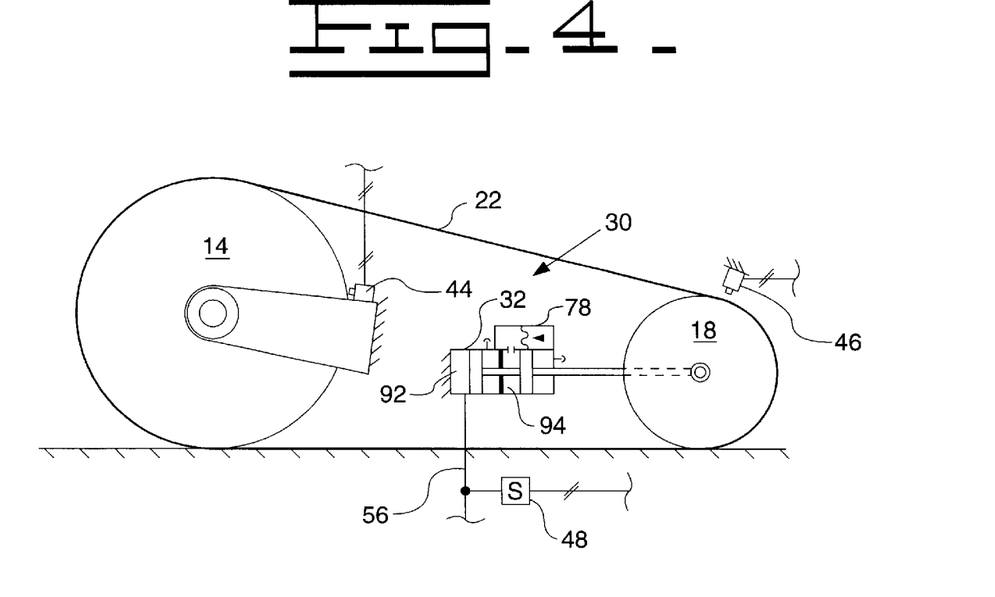
FIG. 4 is a partial diagrammatic and partial schematic representation of yet another embodiment of a portion of the subject invention.

Referring to FIG. 4, another embodiment of the respective hydraulic cylinder arrangements 32,34 and the accumulators 78,80 is disclosed. Since both of the hydraulic cylinder arrangements 32,34 are the same, only the first one will be described. The first hydraulic cylinder arrangement 32 has first and second pistons separated by a portion of the cylinder housing to define first and second piston chambers 92,94. The supply conduit 56 is connected to the first piston chamber 92 and the accumulator 78 is connected to the second piston chamber 94. The forces developed in each of the first and second piston chambers 92,94 act together through the cylinder rod 95 to urge the idler wheel 18 away from the drive wheel 14 to tension the track belt 22. As previously stated, the second hydraulic cylinder arrangement 34 would be the same as the hydraulic cylinder arrangement 32. As diagrammatically illustrated, the rod end chambers are vented. The hydraulic cylinder arrangements 32,34 of the subject embodiment could be used in conjunction with the hydraulic valve arrangement of FIG. 2.

Figure 5:
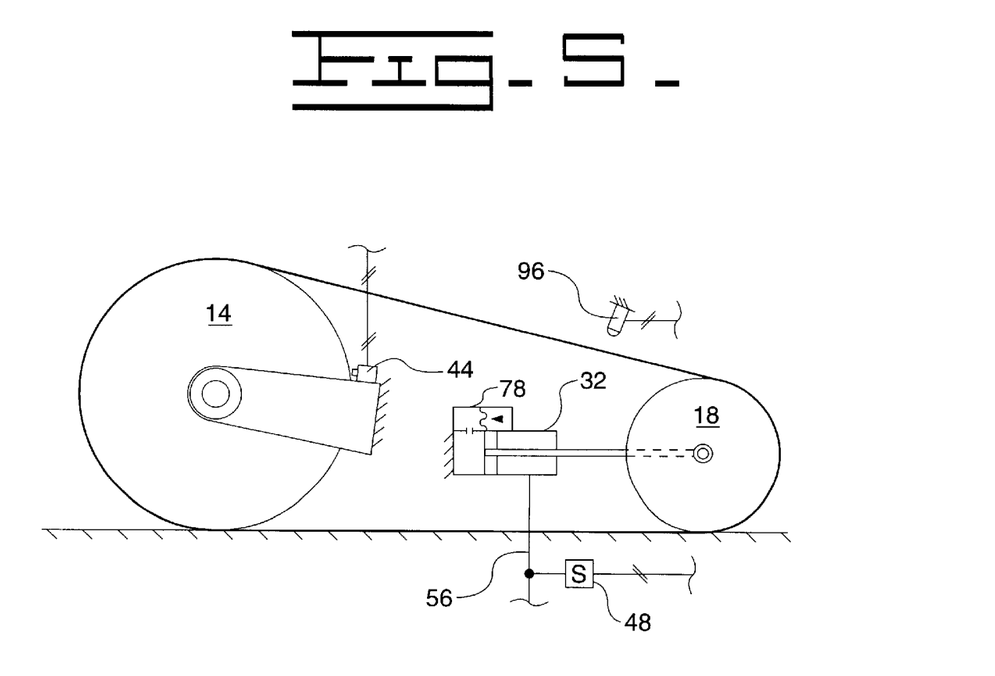
FIG. 5 is a partial diagrammatic and partial schematic representation of still another embodiment of a portion of the subject invention.

Referring to FIG. 5, another embodiment of the hydraulic cylinder arrangements 32,34 and the accumulators 78,80 is illustrated. Again, since the first and second hydraulic cylinder arrangements 32,34 are the same only the first will be described. The accumulator 78 is connected to the one end of the hydraulic cylinder arrangement 32 to create a force to tension the track belt 22 to a predetermined maximum level while the supply conduit 56 is connected to the other end of the hydraulic cylinder arrangement 32 to controllably resist the force created by the accumulator 78.

Additionally, in the embodiment of FIG. 5 the second and fifth sensors 46,52 are replaced with a linear speed sensor, such as a sonar or radar sensor 96, that is operative to sense the speed of the machine 10 with respect to the surface being traversed. The speed of the machine 10 with respect to the surface being traversed is representative of the speed of the respective track belts 22,24. By comparing the forward or reverse speed of the machine 10 with respect to the speed of each of the drive wheels 14,16, the amount of slip between the respective drive wheels 14,16 and the associated belt can be determined and the tension therein can be varied accordingly to control the degree of slip between the respective drive wheel 14,16 and its associated track belt 22,24. It is recognized that during normal working conditions there is normally some tractive slip between the surface being traversed and the respective track belts 22,24. Consequently, when using a sonar or radar sensor, this normal working slip between the surface being traversed and the track belts 22,24 would be factored in when calculating the magnitude of slip between the respective drive wheel 14/16 and the associated track belt 22/24.

Figure 6:
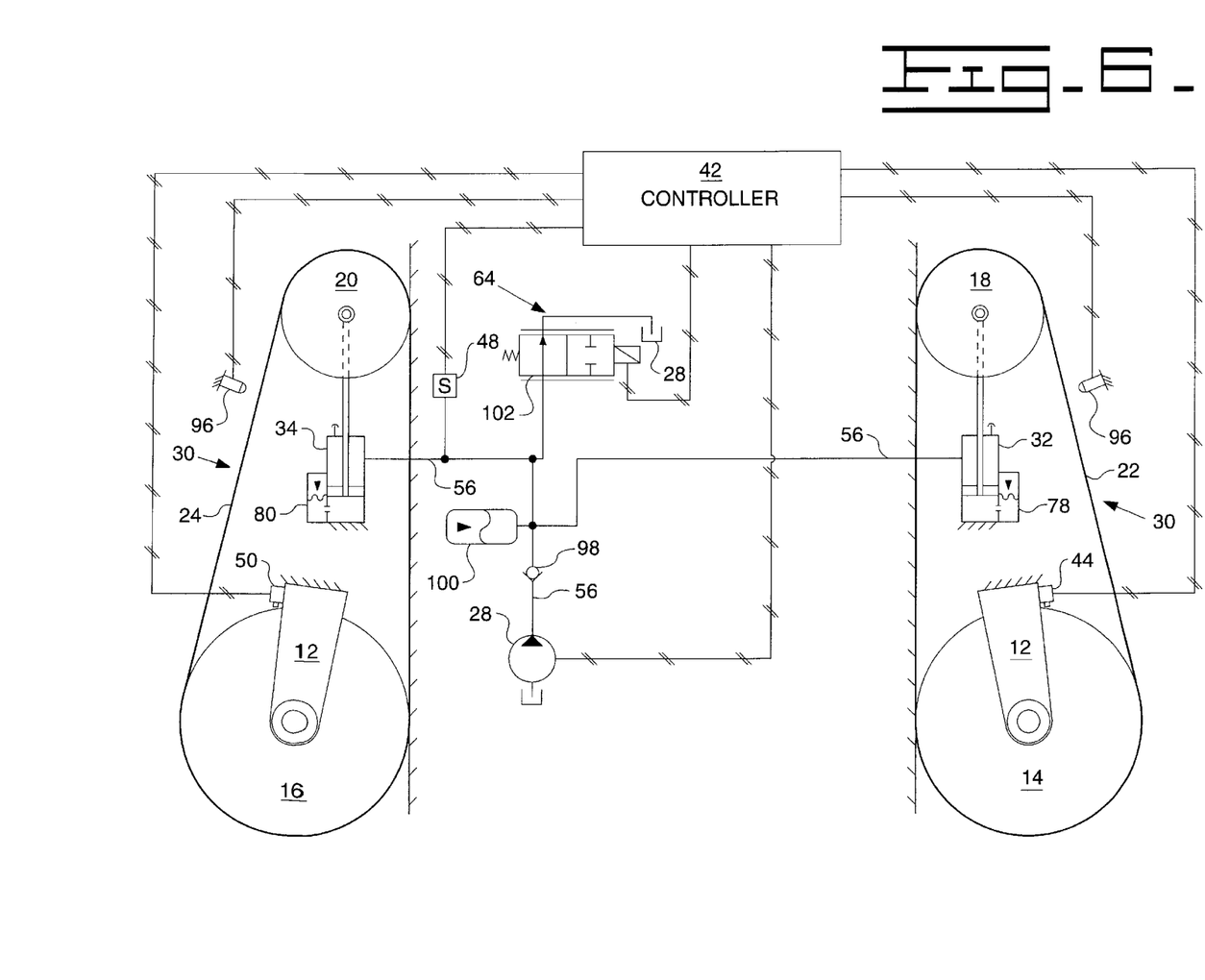
FIG. 6 is a partial diagrammatic and partial schematic representation of still another embodiment of a portion of the subject invention.

Referring to FIG. 6, another embodiment of the subject invention is illustrated. Like elements have like element numbers. In the embodiment of FIG. 3, the source of pressurized fluid 28 is an electrically controlled pump that can be turned on or off and is used to supply pressurized fluid through a one-way check valve 98 that is disposed in the supply conduit 56. The fluid is supplied simultaneously to both of the hydraulic cylinder arrangements 32,34. An accumulator 100 is connected to the supply conduit 56 downstream of the one-way check valve 98. The hydraulic valve arrangement 64 includes an electrically controlled proportional valve 102 disposed between the reservoir 28 and a point on the supply conduit 56 downstream of the one-way check valve 98. The electrically controlled proportional valve 102 is spring biased to a first position at which the supply conduit 56 is in communication with the reservoir 28 and movable towards a second position at which the supply conduit 56 is block from the reservoir. The electrically controlled proportional valve 102 is movable towards the second position in response to receipt of an electrical signal from the controller 42.

The hydraulic cylinder arrangements 32,34 are the same as that set forth with respect to FIG. 5 noted above. In the subject arrangement, a pair of sonar or radar sensors 96 is used to sense the speed of the respective track belts 22,24. The sensors 44,50 are used to sense the speed of the respective drive wheels 14,16.

INDUSTRIAL APPLICABILITY

During operation of the machine 10 incorporating the subject tension management system 40 of FIG. 2, the tension within the respective track belts 22,24 is actively controlled. If, for example, there is slippage between the drive wheel 14,16 and the associated track belt 22 as sensed by the controller 42, the controller 42 directs an electrical signal to the first control valve 68 to direct pressurized fluid through the pilot operated check valve 60 to the hydraulic cylinder arrangement 32 to add extra force to the idler wheel 18 thus adding tension to the track belt 22. Once the force has been increased a predetermined amount as sensed by the third sensor 48, the controller interrupts the electrical signal to the first control valve 68 thus blocking the flow of pressurized fluid therethrough. The controller waits a predetermined time and checks to determine if there is any slippage between the drive wheel 14 and the track belt 22. If there is none, the controller directs an electrical signal to the second control valve 70 to direct pressurized fluid to the pilot stage 62 of the pilot operated check valve 60 to controllably open the check valve 60. With the check valve 60 open, pressurized fluid from the hydraulic cylinder arrangement 32 is vented to the reservoir 28 across the check valve 60 and through the orifice 76 in the drain conduit 74. Once the pressure in the hydraulic cylinder arrangement 32 is reduced to a predetermined amount, the second control valve 70 is returned to its first position thus closing the check valve 60.

After a predetermined amount of time, the controller 42 checks to determine if there is any slippage between the drive wheel 14 and the track belt 22. If there is no slippage, the controller 42 again directs an electrical signal to the second control valve 70 to open the check valve 60 and lower the pressure level in the hydraulic cylinder arrangement 32 a predetermined amount. If there is now slippage, the controller 42 directs an electrical signal to the first control valve 68 to increase the pressure of the fluid in the hydraulic cylinder arrangement 32 a predetermined amount. The controller 42 continually checks to determine whether there is slippage between the drive wheel 14 and the track belt 22 and adjusts the tension in the track belt 22 to maintain the lowest tension level that controls the slippage between the drive wheel 14 and the track belt 22.

The accumulator 78 functions to add a constant force to the hydraulic cylinder arrangement 32 at all times and in the event of loss of pressurized fluid from the pump 26, the accumulator 78 provides sufficient force to maintain a predetermined minimum tension level between the drive wheel 14 and the track belt 22. The accumulator 78 also is used to absorb any recoil of the idler wheel 18.

The tension in the second track belt 24 is controlled in the same manner as set forth above with respect to the tension in the first track belt 22. Consequently, no additional description is needed.

In the operation of the tension management system 40 of FIG. 3, the controller 42 determines if there is slippage between the drive wheel 14 and the track belt 22. If there is slippage, the controller 42 directs electrical signals to the first and second three position control valves 82,84. The electrical signal to the first three position control valve 82 moves it to the operative position to controllably direct pressurized fluid to the one end of the hydraulic cylinder arrangement 32 to increase the tension in the track belt 22. At the same time, the electrical signal to the second three position control valve 84 moves it to the one operative position to controllably permit fluid to escape from the other end of the hydraulic cylinder arrangement 32. After a predetermined time has elapsed, the controller determines if slippage is still occurring. If slippage is still occurring, the controller 42 again directs electrical signals to the first and second three position control valves 82,84 to increase the tension in the belt 22.

The controller 42 continuously checks to determine if there is slippage between the drive wheel 14 and the track belt 22. If there is no slippage after a predetermined time, the controller 42 directs electrical signals to the first and second three position control valves 82,84 to decrease the tension in the track belt 22 by a predetermined amount. The electrical signal to the second three position control valve 84 moves it to the second operative position to direct pressurized fluid to the other end of the hydraulic cylinder arrangement 32 and simultaneously, the electrical signal to the first three position control valve 82 moves it to the second operative position to vent fluid from the one end of the hydraulic cylinder arrangement 32. Following a predetermined time period, if there still is no slippage, the controller 42 again directs electrical signals to the first and second three position control valves 82,84 to decrease the tension in the track belt 22. Once slippage is detected, the controller 42 acts to increase the tension between the drive wheel 14 and the track belt 22 by a predetermined value. By continuously monitoring the track belt tension and adjusting the tension, the tension needed to control slippage is maintained. By controlling the tension in track belt 22 to the level needed to just control slippage, the life of the track belt 22 and the associated components is extended and the wear thereof decreased.

The operation of the embodiment of FIG. 4 to tension the track belt 22 is the same as that of FIG. 2 except the hydraulic cylinder arrangement 32 is different. The accumulator 78 acting within the second piston chamber 94 maintains a constant minimum force acting on the idler wheel 18 to tension the track belt 22. Additional force is added by controllably directing pressurized fluid into the first piston chamber 92. The operation of the tension management system 40 of the embodiment of FIG. 2 to increase or decrease the track belt tension is the same for the embodiment of FIG. 4. The minimum force created by the accumulator 78 on the track belt 22 is sufficient to provide a frictional drive force between the drive wheel 14 and the track belt 22 to ensure continuous tension in the event there is a loss in pressurized fluid from the pump 26.

The operation of controlling the tension in the track belt 22 of FIG. 5 is the same as that with respect to FIG. 2 except the operation of the hydraulic cylinder arrangement 32 is different. The controller 42 is still instrumental in maintaining the desired tension in the track belt 22. In the embodiment of FIG. 5, the accumulator 78 is connected to the one end of the hydraulic cylinder arrangement 32 and applies a force that tensions the track belt 22 to a predetermined maximum level. Pressurized fluid from the pump 26 is controllably directed to the other end of the hydraulic cylinder arrangement 32 to controllably decrease the tension in the track belt 22. The tension management system 40 of FIG. 2 is effectively used in the embodiment of FIG. 5. More specifically, the controller 42 senses the tension in the track belt 22 and if there is no slippage, the controller 42 directs pressurized fluid from the pump 26 into the other end of the hydraulic cylinder arrangement 32 to reduce the force acting on the idler wheel 18. After a predetermined period of time, if there is still no slippage, the controller 42 acts to further increase the pressure in the other end of the hydraulic cylinder arrangement 32 to effectively reduce the tension on the track belt 22. The controller 42 continually checks to determine if there is any slippage between the drive wheel 14 and the track belt 22 and adjusts the force acting on the idler wheel 18 to maintain a tension in the track belt 22 at a level to just control the slippage.

In the operation of the embodiment of FIG. 5, the slippage between the drive wheel 14 and the track belt 22 is determined differently than that in the other embodiments. It is recognized that the slippage of the embodiment of FIG. 5 could be determined in the same way as that of the other embodiments and that the slippage in the other embodiments could be determined in the manner described with respect to FIG. 5.

In FIG. 5, the sonar or radar sensor 96 determines the speed of the machine 10 with respect to the surface being traversed and compares it to the speed of the drive wheel 14. After factoring in a percentage to compensate for normal slippage between the track belt 22 and the surface being traversed, the controller determines the slippage, if any, between the drive wheel 14 and the track belt 22 and adjusts the tension thereof accordingly.

In the operation of FIG. 6, slippage of the respective track belts 22,24 relative to the associated drive wheels 14,16 is determined by the controller 42 in response to receipt of the respective sensors 44,50 and the pair of sonar or radar sensors 96. As noted with respect to FIG. 5, the respective accumulators 78,80 provide a predetermined maximum tension to the respective track belts 22,24. In order to lower the tension on the track belts 22,24, the controller 42 directs an electrical signal to the proportional valve 102 moving it to the second position to block the flow of fluid from the supply conduit 56 to the reservoir. At the same time the controller 42 directs an electrical signal to the pump 28 to cause it to produce pressurized fluid. Once the pressure in the supply 56 reaches a predetermined pressure level, as sensed by the sensor 48, the pump 28 is shut off. This embodiment maintains the same pressure level in both of the hydraulic cylinder arrangements 32,34. The accumulator 100 is operative to provide a reserve of pressurized fluid in the supply conduit 56.

If either of the track belts 22,24 is slipping, the controller directs an electrical signal to the proportional valve 102 to controllably vent pressurized fluid from the supply conduit 56 thus permitting the force subjected by the respective accumulators 78,80 to tension both of the track belts 22,24. As previously noted, the controller 42 makes needed adjustments to the tension in the track belts 22,24 to maintain the needed force so that the track belts 22,24 are not slipping with respect to the drive wheels 14,16.

The subject arrangement in FIG. 6 as compared to the previous embodiments provides a tension management system that uses less components while still ensuring a tension management system that controls slippage between the respective drive wheels 14,16 and the associated track belts 22,24.

In view of the foregoing, it is readily apparent that the structure of the present invention provides a tension management system 40 that actively controls the slippage between a drive wheel 14 and a track belt 22. By controlling the tension in the track belt 22 to a level that just controls the slippage between the drive wheel 14 and the track belt 22, the life of the track belt and associated components is increased and/or the wear thereof is reduced without sacrificing the operation of the machine 10 in varying operating conditions.

Other aspects, objects and advantages of this invention can be obtained from a study of the drawings, the disclosure and the appended claims.

We claim:

1. A tension management system mounted to a machine having a friction drive between a drive wheel of the machine and a track belt, a source of pressurized fluid, a reservoir, a frame assembly, and a hydraulic actuator arrangement acting through an idler wheel to tension the track belt with respect to the friction drive wheel, wherein the tension management system comprises:
   a first sensor operative to sense the speed of the drive wheel;
   a second sensor operative to sense the speed of the track belt;
   a third sensor operative to sense the operating pressure in the hydraulic actuator arrangement;
   a hydraulic valve arrangement connected between the source of pressurized fluid, the hydraulic actuator arrangement, and the reservoir; and
   a controller operative to receive the sensed speeds of the drive wheel and the track belt and determine their respective linear output speeds sand deliver control signals to the hydraulic valve arrangement to control the tension of the track belt on the drive wheel in response to the difference in linear output speed between the drive wheel and the track belt changing from a predetermined value.

2. The tension management system of claim 1 wherein the hydraulic actuator arrangement includes a hydraulic cylinder arrangement connected between the frame assembly and the idler wheel and the hydraulic valve arrangement includes a control valve operative to proportionally control the flow of pressurized fluid through a supply conduit to one end of the hydraulic cylinder arrangement.

3. The tension management system of claim 2 wherein a pilot operated check valve is disposed in the supply conduit between the hydraulic valve arrangement and the hydraulic cylinder arrangement and an orifice is disposed in a drain conduit connected between the reservoir and a point on the supply conduit between the hydraulic valve arrangement and the pilot operated valve.

4. The tension management system of claim 3 wherein the control valve is an electrically actuated control valve and an accumulator is connected to the hydraulic cylinder arrangement and in fluid communication with the one end of the hydraulic cylinder arrangement.

5. The tension management system of claim 4 wherein the pilot operated check valve has a pilot stage and a second electrically actuated control valve is disposed between the source of pressurized fluid and the pilot operated check valve and operative to communicate the source of pressurized fluid to the pilot stage of the pilot operated check valve.

6. The tension management system of claim 5 wherein the second sensor is sensing the speed of the track belt by sensing the speed of the idler wheel.

7. The tension management system of claim 5 wherein the second sensor is sensing the speed of the track belt by sensing the speed of the machine relative to the surface being traversed.

8. The tension management system of claim 5 wherein the machine includes a second drive wheel, a second idler wheel, and the hydraulic actuator arrangement includes a second hydraulic cylinder arrangement operatively connected between the frame assembly and the idler wheel and the tension management system includes a fourth sensor operative to sense the speed of the second drive wheel, a fifth sensor operative to sense the speed of the track belt, a sixth sensor operative to sense the operating pressure in the second hydraulic cylinder arrangement, a second hydraulic valve arrangement connected between the source of pressurized fluid and the second hydraulic cylinder arrangement, and the controller is operative to receive the signals from the fourth, fifth, and sixth sensors and determine the linear output speeds of the track belt and the drive wheel and deliver control signals to the second hydraulic valve arrangement to control the tension of the track belt in response to the difference in linear output speeds between the drive wheel and the track belt changing from a predetermined value.

9. The tension management system of claim 8 wherein the second hydraulic valve arrangement includes a third electrically actuated control valve connected to the hydraulic cylinder arrangement through a second supply conduit and a second pilot operated check valve is disposed in the second supply conduit between the third electrically actuated control valve and the hydraulic cylinder arrangement, a fourth electrically actuated control valve is disposed between the source of pressurized fluid and the pilot operated check valve, and a second drain conduit having an orifice disposed therein is connected between the reservoir and a point on the second supply conduit between the fourth electrically actuated control valve and the pilot operated check valve.

10. The tension management system of claim 9 wherein a second accumulator is connected to the second supply conduit adjacent the second hydraulic cylinder arrangement.

11. The tension management system of claim 3 wherein the hydraulic actuator arrangement includes a hydraulic cylinder having two separate piston chambers and the supply conduit is connected to one of the piston chambers and an accumulator is connected to the hydraulic cylinder and in communication with the other piston chamber.

12. The tension management system of claim 3 wherein the hydraulic actuator arrangement includes a hydraulic cylinder having the one end connected to the source of pressurized fluid operative to selectively lower the tension on the track belt and the other end connected to an accumulator operative to increase the tension on the track belt.

13. The tension management system of claim 2 wherein the control valve also selectively controls the fluid flow from the one end of the hydraulic cylinder arrangement to the reservoir and includes a second control valve operative to proportionally control the flow of pressurized fluid through a second supply conduit to and from the other end of the hydraulic cylinder arrangement.

* * * * *